US007469464B1

(12) United States Patent
Bjorstrom et al.

(10) Patent No.: US 7,469,464 B1
(45) Date of Patent: Dec. 30, 2008

(54) METHOD FOR ADJUSTING A HEAD SUSPENSION FOR POSITIONING A READ/WRITE HEAD OVER A DISK

(75) Inventors: Jacob D. Bjorstrom, Hutchinson, MN (US); Michael W. Davis, Rockford, MN (US); Craig A. Leabch, Saint Cloud, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 352 days.

(21) Appl. No.: 10/931,815

(22) Filed: Sep. 1, 2004

(51) Int. Cl.
*G11B 5/127* (2006.01)
*H04R 31/00* (2006.01)

(52) U.S. Cl. ............... 29/603.06; 29/603.03; 29/603.04; 216/65; 360/294.4; 360/294.7; 360/244.2; 360/244.8

(58) Field of Classification Search ............. 29/603.03, 29/603.04, 603.06, 603.1; 216/65; 360/294.4, 360/294.7, 240, 244, 244.2, 244.8
See application file for complete search history.

(56) References Cited

U.S. PATENT DOCUMENTS

| | | | |
|---|---|---|---|
| 5,014,144 A | 5/1991 | Sato et al. | |
| 5,331,489 A | 7/1994 | Johnson et al. | |
| 5,428,490 A | 6/1995 | Hagen | |
| 5,434,731 A | 7/1995 | Hagen | |
| 5,473,488 A * | 12/1995 | Gustafson et al. | 360/245.5 |
| 5,499,153 A | 3/1996 | Uemura et al. | |
| 5,504,640 A | 4/1996 | Hagen | |
| 5,612,841 A | 3/1997 | Johnson | |
| 5,875,071 A | 2/1999 | Erpelding et al. | |
| 5,923,500 A | 7/1999 | Hagen | |
| 5,956,209 A | 9/1999 | Shum | |
| 6,011,239 A * | 1/2000 | Singh et al. | 219/121.6 |
| 6,157,520 A | 12/2000 | Mangold et al. | |
| 6,288,875 B1 | 9/2001 | Budde | |
| 6,397,455 B1 | 6/2002 | Hagen | |
| 6,480,459 B2 | 11/2002 | Budde | |
| 7,069,156 B2 * | 6/2006 | Zeng | 702/43 |
| 2004/0037011 A1 * | 2/2004 | Inoue et al. | 360/313 |

FOREIGN PATENT DOCUMENTS

| | | | |
|---|---|---|---|
| JP | 61122917 A | * | 6/1986 |
| JP | 11053854 | | 2/1999 |
| WO | WO 98/45841 | | 10/1998 |

OTHER PUBLICATIONS

Yoneoka, et al., *Flying Head Assemblies*, Fujitsu Sci. Tech. J., 25, 4, pp. 404-414 (Feb. 1991).

* cited by examiner

*Primary Examiner*—Paul D Kim
(74) *Attorney, Agent, or Firm*—Faegre & Benson LLP

(57) ABSTRACT

A method for adjusting a performance parameter of a head suspension for positioning a read/write head in a disk drive. The suspension includes a beam and flexible element for carrying a read/write head extending from the beam. The flexible element has one or more adjustment portions. The beam has one or more openings adjacent to the adjustment portions of the flexible element to provide access to the adjustment portions through the beam. The method comprises acting upon one or more adjustment portions of the flexible element through one or more of the openings in the beam to change a performance parameter of the head suspension. A laser beam is used to irradiate the adjustment portions of the flexible element in one embodiment of the invention.

2 Claims, 7 Drawing Sheets

METHOD FOR ADJUSTING A HEAD SUSPENSION FOR POSITIONING A READ/WRITE HEAD OVER A DISK

FIELD OF THE INVENTION

The invention relates generally to head suspension systems in rigid disk storage devices. More particularly, the invention relates to a narrow flexure particularly useful in miniaturized storage devices.

BACKGROUND OF THE INVENTION

In a rigid disk storage device, one or more rotating disks, such as magnetic disks (sometimes referred to as "platters"), are used to store information. Rigid disk storage devices typically include a frame to provide attachment points and orientation for other components, and a spindle motor mounted on the frame for rotating the disk. A read/write element is formed on a "head slider" for reading and writing data from and to the disk surface. The head slider typically is supported and oriented relative to the disk by a head suspension assembly, providing both the force and compliance necessary for proper head slider operation. The head suspension assembly typically comprises a loadbeam and flexure, which can be attached to, or integrally formed with, the loadbeam. The head suspension assembly typically is attached to an actuator arm or E-block, which is in turn attached to an actuator. As the disk in the storage device rotates beneath the head slider and head suspension, the air above the disk also rotates, thereby creating an air bearing which acts with an aerodynamic design of the head slider to create a lift force on the head slider. The balance between the lift force and load force exerted by the head suspension substantially determines the distance, or "flying height" between the read/write head and the surface of the disk.

The trend in the evolution of dynamic rigid disk storage devices is toward higher data storage density, higher read/write speed, and smaller device size. To achieve higher data storage density, the read/write head must be sufficiently close to the disk surface. That is, the flying height must be sufficiently small. For example, for a data density of about 7.8 Gigabytes/cm$^2$ or greater on a magnetic hard drive, the flying height of the slider is typically on the order of 10 nm or less.

To consistently attain such small flying heights, the performance parameters of the suspension assembly must be controlled carefully. One critical parameter is the static attitude, which is the angular attitude of the slider's read/write surface facing the disk as mounted relative to disk surface. If the static attitude is set improperly, undesired slider pitch or roll may result. To ensure that the performance parameters are properly set, not only is the manufacturing process of the various components of the head suspension carefully controlled, at least some of the parameters are also measured and adjusted when necessary after the head suspension is assembled. Adjustment of certain parameters, including the static attitude, requires external post-assembly access to certain components, such as the flexure.

In certain types of head suspensions, a portion of the loadbeam overhangs the flexure such that at least a substantial length of the flexure is positioned between the disk surface and the loadbeam. Such extension in the loadbeam has several applications. As one example, there can be range limiters formed on a loadbeam and/or the flexure extending from the loadbeam to prevent the flexure from being deformed beyond a certain state. As another example, the loadbeam can extend over the entire length of the flexure and include a head lifter tab at the tip of the loadbeam for parking the slider head. In these types of head suspensions, the flexure is commonly made with portions wider than the overhanging portion or portions of the loadbeam so that those wider portions of the flexure are accessible from the loadbeam side of the flexure. Certain performance parameters can thus be adjusted by altering the characteristics of the accessible portions of the flexure.

Such widening of flexure, however, is undesirable for maximizing the overall storage capacity density of the storage device, i.e., the storage capacity per unit volume of the device. A wider flexure increases the minimum distance the slider head can approach the hub of the disk, thus making a greater portion of the disk near the hub unavailable for data storage and thus wasting device volume. Additional undesirable effects of such widening of the flexure include the lowered natural frequencies of the flexure and increased wind induced off-track that can be associated with it.

There is thus a need for a head suspension with improved characteristics, with better utilization of device space while maintaining the ability to adjust performance parameters of the head suspension.

SUMMARY OF THE INVENTION

The invention is a method for adjusting a head suspension for positioning a read/write head over a disk in a disk drive, the head suspension being of a type having a flexible element for carrying the read/write head, and having a beam that is more rigid than the flexible element and from which the flexible element extends. The method comprises acting, for example by laser irradiation or mechanical manipulation, upon a portion of the flexible element through an opening in the beam to change a performance parameter, such as static attitude or gram load, of the head suspension.

The invention is also a head suspension for positioning a read/write head over the surface of a disk in a disk drive. The suspension comprises a loadbeam extending from an actuator portion for moving the loadbeam, the loadbeam having a proximal end and distal end, the proximal end being closer to the actuator portion than the distal end is, and a flexible element extending from the loadbeam for carrying the read/write head. The flexible element is more flexible than the loadbeam and has a suspension adjustment portion adapted to be acted upon to change a performance parameter of the head suspension. The loadbeam defines an opening through which the suspension adjustment portion of the flexible element can be acted on to change the performance parameter of the suspension. The loadbeam preferably overhangs the entire suspension adjustment portion. The flexible element further comprises a head support portion, which is positioned between two suspension adjustment portions. The head support portion can include a platform, which can be integrally formed with the suspension adjustment portions, and a stand-off for mounting the read/write head at a sufficient distance from the platform to prevent the read/write head from coming into contact with any other area of the flexible element or loadbeam under normal operating conditions of the disk drive.

BRIEF DESCRIPTION OF THE DRAWINGS

Other objects and advantages of the invention will become apparent upon reading the following detailed description and upon reference to the drawings in which.

DETAILED DESCRIPTION OF SPECIFIC EMBODIMENTS

Figure 1:
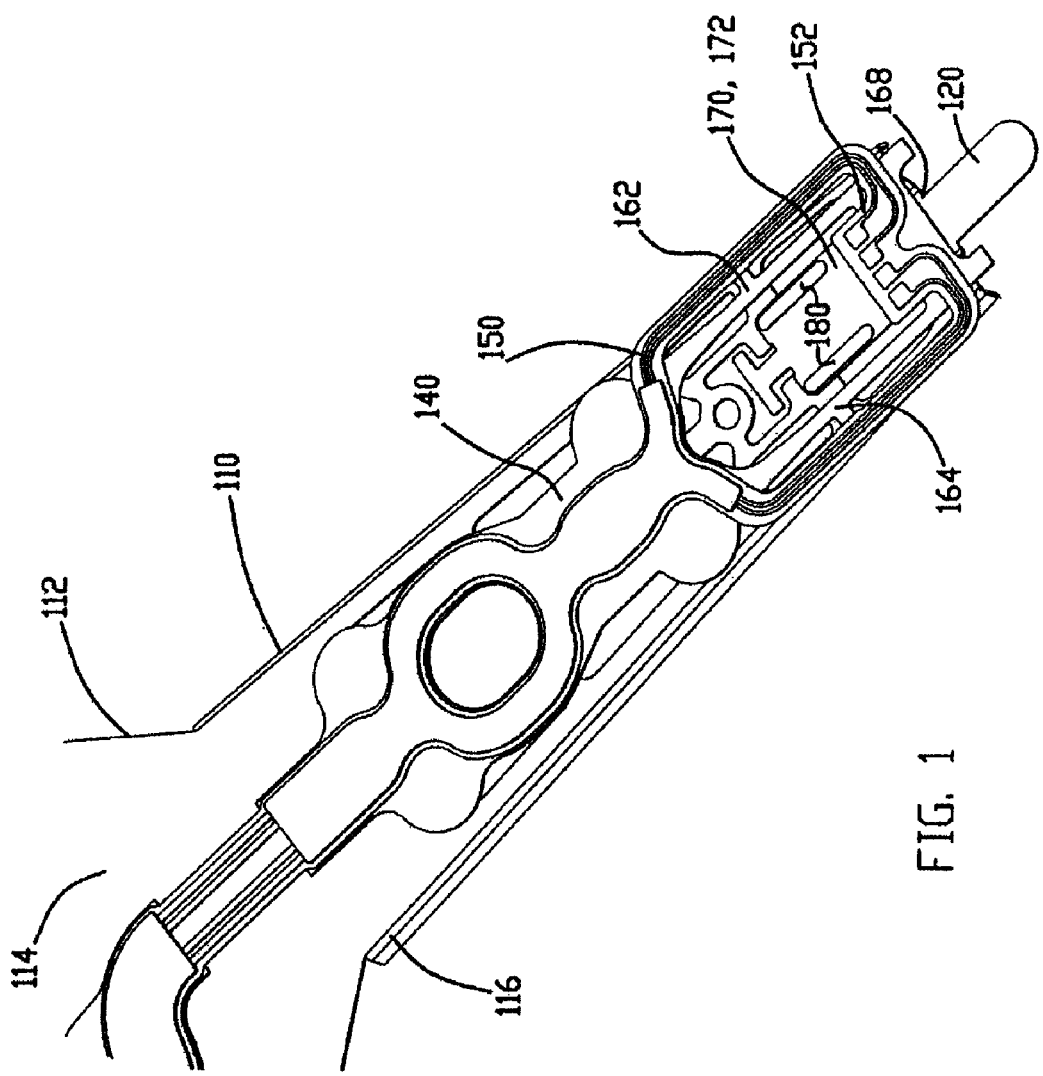
FIG. 1 shows the bottom view of a head suspension in one embodiment of the invention. The "bottom view" refers to the side facing the disk over which the head suspension is designed to position a read/write head.
Figure 2:
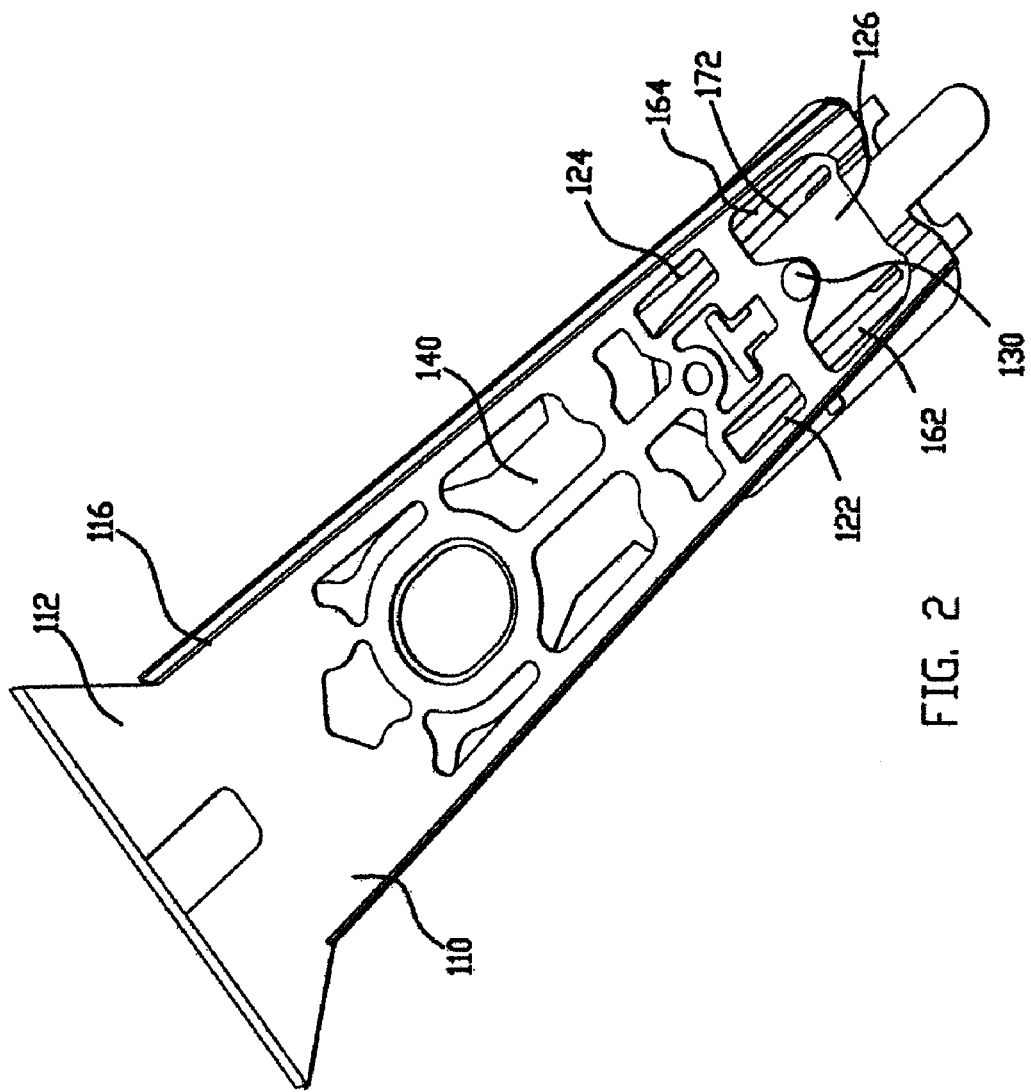
FIG. 2 shows the head suspension, shown in FIG. 1, viewed from the top.

Referring to FIGS. 1 and 2, a first illustrative embodiment of the invention is a suspension 100, which includes a loadbeam 110 and a flexible element, or flexure 140 attached to the loadbeam 110. The loadbeam 110 is connected to, or integrally formed with, an actuator arm 114 via a spring region 112. The actuator arm 114 is typically driven by an actuator, which moves the head suspension 100. The loadbeam 110 is made of stainless steel and has side rails 116 as stiffening members. The flexure 140 is made of a stainless steel/polyimide/copper alloy laminate but can also be made of other suitable materials including stainless steel. The flexure 140 is more flexible than the loadbeam due to its smaller cross-sectional areas and lack of stiffening members. Other suitable materials and shapes well known in the art can also be employed to form the loadbeam and flexure. The loadbeam 110 and flexure 140 extend in the same general direction, i.e., generally across the surface of the disk when the disk drive is in operation. This general direction encompasses any small deviations in directions between the loadbeam 110 and flexure 140 as a result of bending of the flexure 140.

The flexure 140 is attached to the loadbeam 110 in this case by welding and comprises two narrow, elongated, suspension adjustment portions 162 and 164 located on the suspension spring arms, which can be acted upon to modify one or more performance parameters, such as static attitude and gram load. The suspension spring arms including the suspension adjustment portions 162, 164 are joined at the distal end 168, where the flexure 140 comprises a head support portion 170. In this illustrative embodiment of the invention, the head support portion 170 extends from the distal end 168 of the flexure 140 back towards the proximal end 169 of the flexure 140 such that the head support portion 170 is positioned between the suspension adjustment portions 162 and 164. An example of such a head support is disclosed in the U.S. patent application Ser. No. 09/858,303, filed May 15, 2001, and commonly owned with the present application. Head support of other configurations can also be used.

With more particular reference to FIG. 2, the loadbeam 110 in this embodiment further includes several openings 122, 124 and 126 that provide access to the suspension adjustment portions 162 and 164 of the flexure 140 from the loadbeam side, or top side, of the flexure 140. Such access allows actions on the flexure, such as laser irradiation or mechanical manipulation, to adjust performance parameters of the suspension. Although, in the embodiment shown in FIGS. 1 and 2, access to the suspension adjustment portions 162 and 164 is permitted from the slider side, at least prior to mounting the slider, it is often advantageous to have access from the loadbeam side as well. The minimum sizes needed and locations of the openings 122, 124 and 126 depend on the particular methods and instruments for adjustment. In this illustrative embodiment, the openings 122, 124 and 126 are sized to accommodate the use of an instrument for dynamic adjustment of static attitude, which uses scanning laser beams to modify the static attitude of the suspension. Examples of static attitude adjustment using laser beams are disclosed in the U.S. patent application Ser. No. 09/500,592, which is commonly owned with the present application, and which is incorporated herein by reference. It is typically desirable to expose as much of the suspension adjustment portions 162 and 164 as possible to maximize the available range of adjustment. Other methods for adjusting static attitude can also be used with the invention. For example, mechanical devices can be used to adjust the static attitude. An example of such devices is disclosed in the U.S. patent application Ser. No. 10/839,492, which is commonly owned with the present application, and which is incorporated herein by reference.

The loadbeam 110 in the illustrative embodiment overhangs substantially the entire length and width of the flexure 140. In particular, the suspension adjustment portions 162 and 164 fall substantially entirely within the width of the portions of the loadbeam 110 over the suspension adjustment portions 162 and 164. The loadbeam 110 also overhangs the head support portion 170.

The head support portion 170 comprises a platform 172 and one or more standoffs 180 on which the read/write head is to be mounted. The patterned components of the flexure 140 in this example, with the possible exception of the standoffs 180, is formed from a flat sheet of metal without plastically deforming the platform 172. The top surface of the platform 172 is thus coplanar with the remainder of the flexure 140 except possibly for a small deviation due to any elastic deformation of the flexure due to the weight of the read/write head and flexure itself. Any suitable material can be used for the standoffs. Examples include dielectric materials such as polyimide and metals such as copper, nickel and gold. The standoffs 180 can also be formed from the platform 172 itself by dimple protrusions, or protuberances, on the surface of the platform by a number of well known sheet metal forming processes. In a preferred embodiment, the standoffs 180 are formed from layered structures. Each standoff has a polyimide layer and a copper layer deposited on top of the polyimide layer. In this preferred embodiment, the thickness of the copper layers is 12 μm, and the thickness of the polyimide layers is 10 μm. Of course, the standoffs can be of any suitable height depending on the design. Standoffs of other shapes, such as copper rings, can also be used.

The loadbeam 110 further includes a pivoting structure, which in this case is a dimple protrusion 130, which, in operation, is in contact with the top side of the platform 172 to pivot the pitch and roll of the slider head. In this embodiment, the dimple protrusion 130 is also of sufficient height, in combination with the standoffs 180, to position the read/write head at a vertical distance from the loadbeam 110 so that no part of the read/write head would touch any other part of the loadbeam or flexure due to pitch and roll of the read/write head under normal conditions of disk operation or even of contemplated abnormal impact. For the sizes of the suspension components used in the illustrative embodiment, a dimple protrusion of about 60 μm in height is used. Other dimple protrusion heights can be used depending on the specific design of the suspension. The use of a dimple protrusion on the loadbeam 110 to keep the slider head at a desired distance from the loadbeam has the advantage of obviating the need to deform the flexure during the process of making the flexure.

The suspension 100 in this embodiment also includes electrical conductors 150, which are metalization lines deposited on a dielectric substrate and terminating at contact pads 152 for electrical connections to the read/write head. The electrical conductors 150 in this case are routed outside the suspension adjustment portions 162, 164 of the flexure 140 to allow access to the suspension adjustment portions 162, 164 of the flexure 140 from the bottom side of the suspension 100, at least when the read-write has not been installed.

Figure 3:
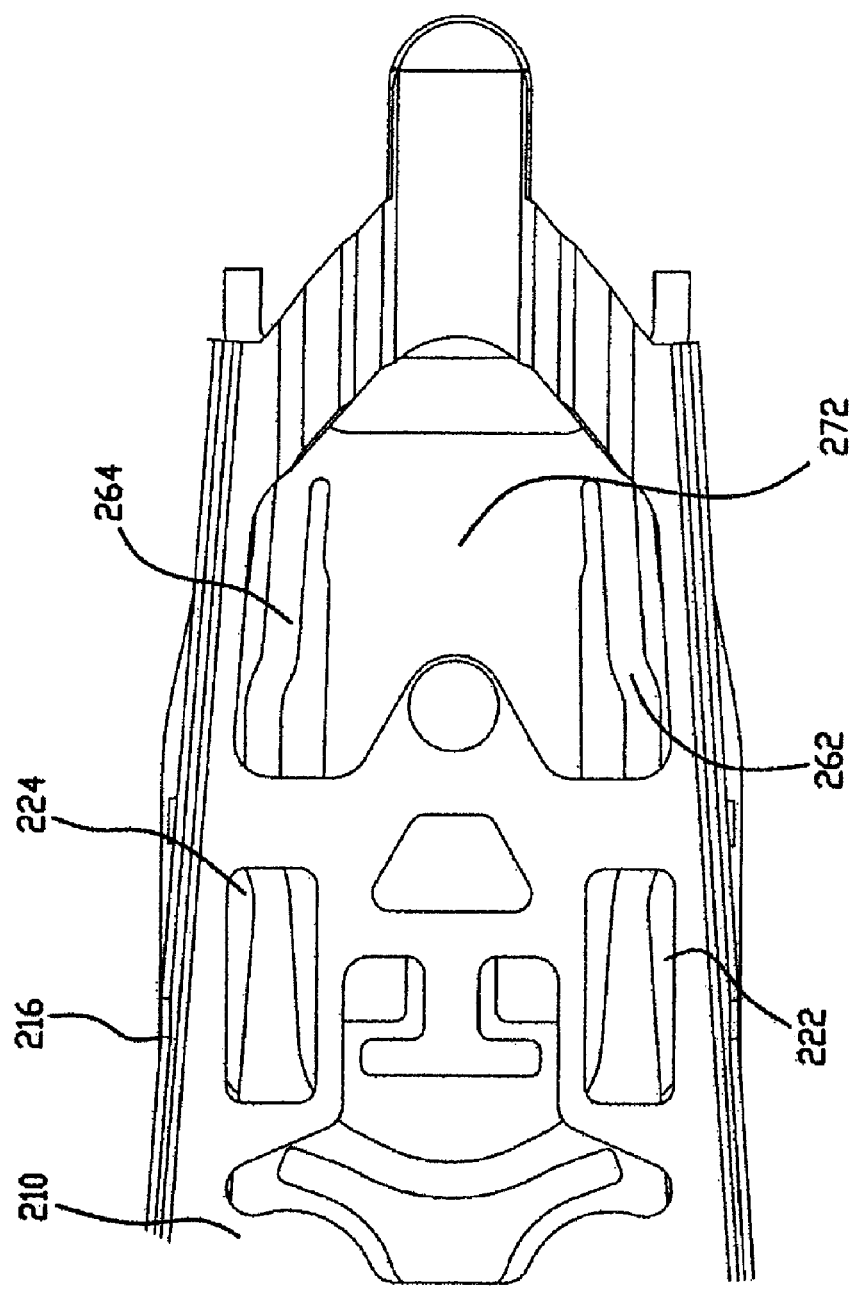
FIG. 3 shows a head suspension in a second embodiment of the invention.

A second embodiment of the invention is shown in FIG. 3. The suspension is similar to that shown in FIGS. 1 and 2 but with slightly different geometries of the openings on the loadbeam 210 and of the suspension adjustment portions 262 and 264, which in this case has more complex shapes than the suspension adjustment portions 162 and 164 shown in FIG. 1. The more contorted shapes of the suspension adjustment portions allows for optimization of placement of the openings 222, 224 and 226 in the loadbeam 210. The width of the loadbeam 210, as measured between the side rails 216, is about 1.4 mm at the narrowest tip end and about 1.6 mm at the point between the openings 222 or 224 and 226. The vertical bending stiffness in this particular example is about 56.9 Newtons/meter (N/m), and the lateral bending stiffness about 3630 N/m. The pitch stiffness is about 0.60 micro-Newtons-meter/degree ($\mu$Nm/°), and the roll stiffness about 0.69 $\mu$Nm/°.

Figure 4:
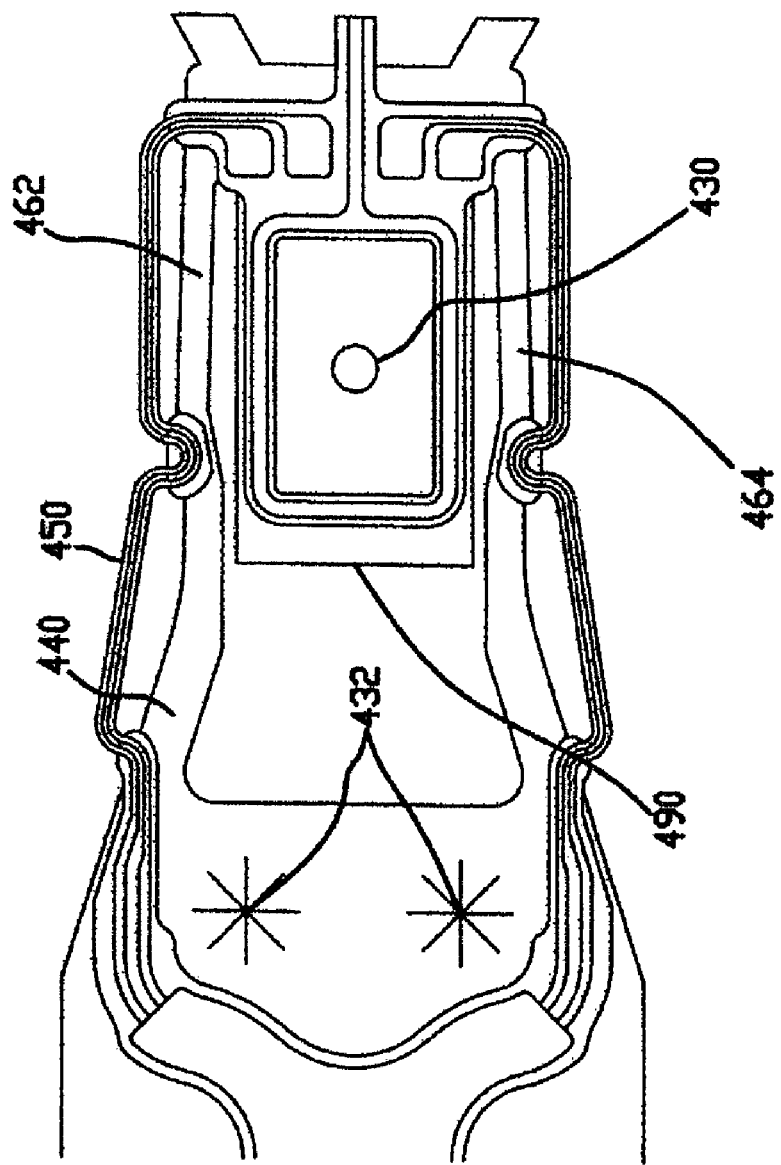
FIG. 4 shows the flexible element in a third embodiment of the invention.

FIG. 4 shows a third embodiment of the invention. The flexure 440 has suspension adjustment portions 462 and 464 located inside the electrical conductors 450 so that the conductors 450 do not interfere with the access to the suspension adjustment portions 462 and 464 from the slider side. The electrical conductors are anchored at various locations on the flexure 440, with some locations on the suspension adjustment portions 462 and 464 themselves. As shown in FIG. 4, once the slider 490 is mounted on the flexure 440, the suspension adjustment portions 462 and 464 becomes only partially accessible from the slider side. The widths of the suspension adjustment portions are also non-uniform, with the segments in the opening 422 and 424 being wider than those in the opening 426.

Figure 5:
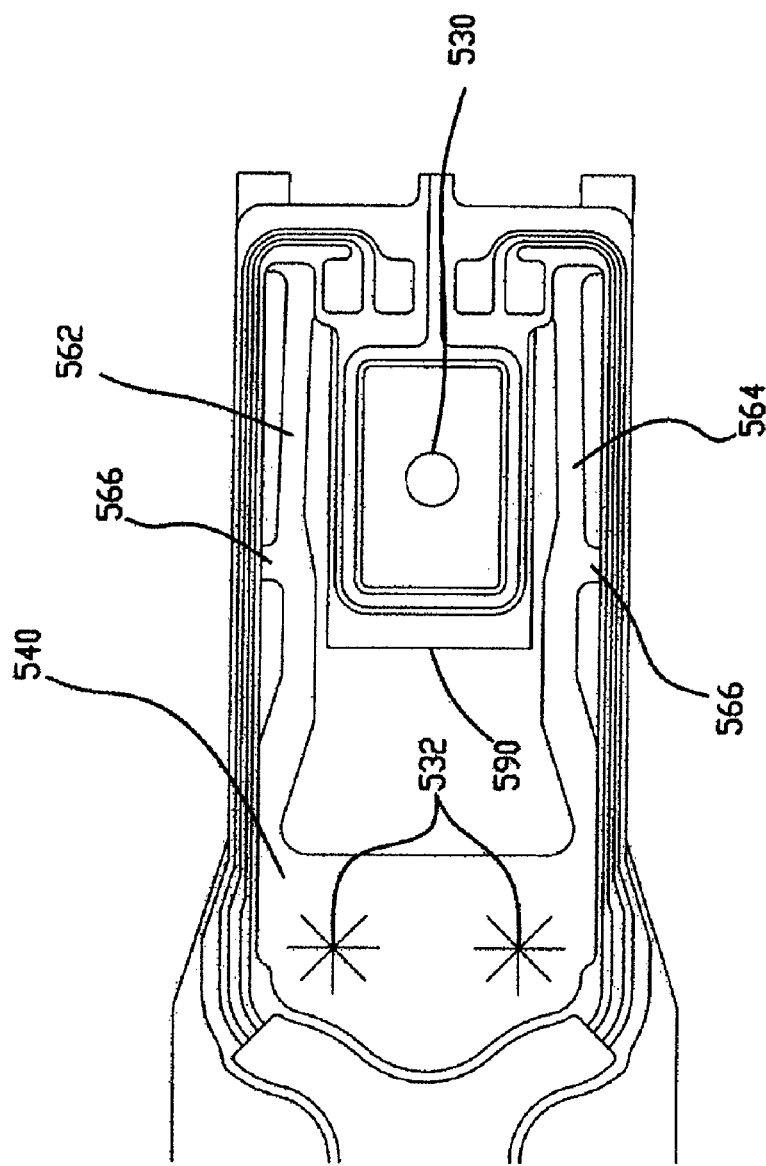
FIG. 5 shows the flexible element in a fourth embodiment of the invention.
Figure 6:
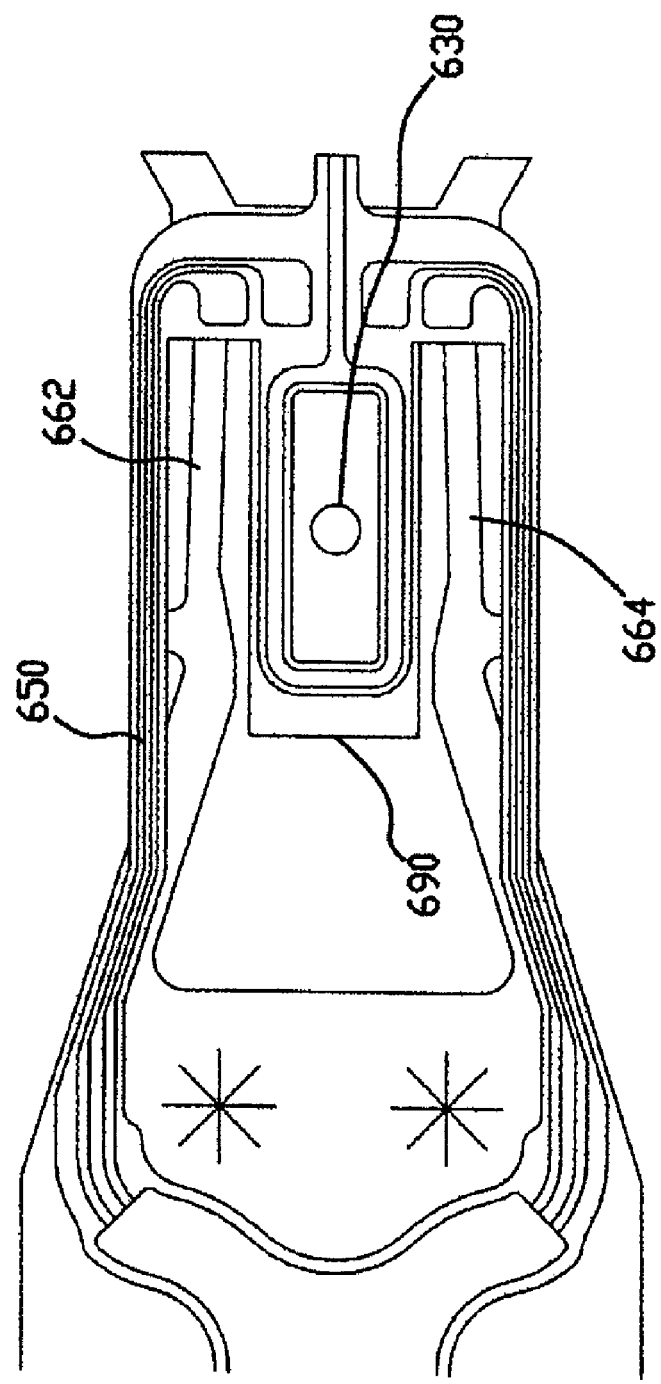
FIG. 6 shows the flexible element in a fifth embodiment of the invention.

FIGS. 5 and 6 show a fourth and fifth embodiments, respectively, of the invention. The flexure 540 (640) includes tabs 566 (666) extending outwardly from the suspension adjustment portions 562 (662) and 564 (664) to provide structural support for the electrical conductors 550 (650). Suspension adjustment portions 662 and 664 are completely overlapped by the slider.

Figure 7:
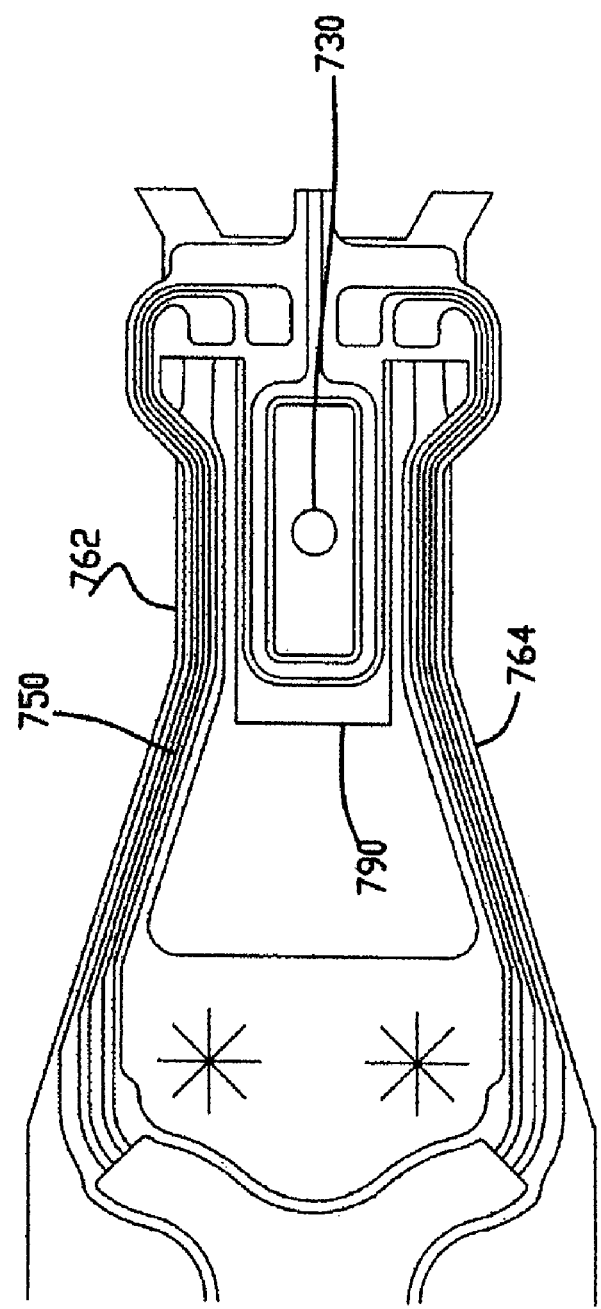
FIG. 7 shows the flexible element in a sixth embodiment of the invention.

FIG. 7 shows a sixth embodiment of the invention. This embodiment achieves the narrowest over-all width of the head suspension 700, but with more limited access to the suspension adjustment portions 762 and 764 from the slider side due to the overlapping between the electrical conductors 750 and the suspension adjustment portions 762 and 764. However, the suspension adjustment portions 762 and 764 are still accessible from the loadbeam side through the appropriately positioned openings in the loadbeam (not shown). Suspension adjustment portions 762 and 764 are completely overlapped by the slider.

Thus, the invention offers several advantages, among which are the reduced total width of the head suspensions and the resultant increased potential storage density and reduced wind-induced effects. The adjustability of the head suspension is retained by accessing the flexure through openings in the loadbeam The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for adjusting a head suspension for positioning a read/write head over a disk in a disk drive, the suspension having a flexible element with a head-support portion for carrying the read/write head and one or more spring arms with adjustment portions supporting the head-support portion, and having a beam that is more rigid than the flexible element and from which the flexible element extends, the beam having one or more openings adjacent to the adjustment portions of the spring arms to provide access to the adjustment portions through the beam, and wherein the method comprising: attaching the flexible element on a surface of the beam; and acting upon one or more of the spring arm adjustment portions of the flexible element through one or more of the openings in the beam to change a static attitude of the head suspension by irradiating exposed portions of the adjustment portions of the flexible element through one or more of the openings in the beam with a laser beam.

2. The method of claim 1, further comprising irradiating the adjustment portions of the flexible element with another laser beam from an opposite side of the adjustment portions of the flexible element.

* * * * *